(12) United States Patent
Parks et al.

(10) Patent No.: US 7,237,275 B1
(45) Date of Patent: Jul. 3, 2007

(54) PORTABLE TOILET

(75) Inventors: Kevin Parks, 9016 Quail Run Dr., Chattanooga, TN (US) 37421; Gary Ingram, Ooltewah, TN (US)

(73) Assignee: Kevin Parks, Chattanooga, TN (US)

( * ) Notice: Subject to any disclaimer, the term of this patent is extended or adjusted under 35 U.S.C. 154(b) by 246 days.

(21) Appl. No.: 11/070,974

(22) Filed: Mar. 3, 2005

(51) Int. Cl.
*A47K 11/02* (2006.01)
(52) U.S. Cl. .......................................... 4/460
(58) Field of Classification Search ............. 4/449, 4/460, 483; 182/181.1–186.5
See application file for complete search history.

(56) References Cited

U.S. PATENT DOCUMENTS

| | | | | |
|---|---|---|---|---|
| 1,521,740 A | * | 1/1925 | Wernli et al. ............... 4/484 |
| 2,648,761 A | * | 8/1953 | Shamel ................... 340/908.1 |
| 4,298,093 A | * | 11/1981 | Wing ........................ 182/153 |
| 4,429,765 A | * | 2/1984 | Garcia ....................... 182/153 |
| 4,506,761 A | * | 3/1985 | Brown ..................... 182/186.2 |
| 5,230,105 A | * | 7/1993 | Watson ......................... 4/460 |
| 5,720,362 A | * | 2/1998 | Denkins ................... 182/182.2 |

* cited by examiner

*Primary Examiner*—Charles E. Phillips
(74) *Attorney, Agent, or Firm*—Stephen J. Stark; Miller & Martin PLLC

(57) ABSTRACT

A portable toilet comprises two sets of leg members connected at a joint at top ends of the leg members. The legs preferably pivot between a closed configuration wherein the legs are substantially parallel to an open position where the legs are spaced apart at one end and joined at the pivot at the top ends. Seat members are supported by the legs in a spaced apart and parallel relationship. In some embodiments, the seat members are removable to assist in portage of the toilet.

4 Claims, 5 Drawing Sheets

PORTABLE TOILET

BACKGROUND OF THE INVENTION

1. Field of the Invention

This invention relates to a portable toilet seat with stand suitable for a variety of uses including camping.

2. Prior Art

Camping is a popular outdoor activity which many people enjoy. Sometimes camping can occur in conjunction with hunting, fishing, canoe tripping, backpacking, nature study, or scouting. Other time spent in the outdoors such as for work or pleasure may also be considered to be camping.

As has been discussed in Watson, U.S. Pat. No. 5,230,105, defecating in the wilderness may be a deterrent to some who may otherwise enjoy the outdoor experience. Additionally, women may find a toilet convenient in the outdoors for urinating.

Although Watson discloses a portable toilet which may be disassembled and stored in a bag. It comes as a kit in ten parts. The loss of any one of the ten parts could prevent a potential user from correctly constructing the toilet for use. Furthermore, although the lower feet may provide a way to prevent the legs from sinking into soft ground, they may end up with urine or feces on these members after use. Accordingly, a need exists for an improved camp toilet.

The need to have a portable commode is not new. Baker obtained U.S. Pat. No. 223,574 in 1880 for a portable commode which has two sets of hinged legs which are hinged at about the midpoint of the legs. At the top of the legs is placed a seat for performing the necessary business. This basic use has been adapted and improved as evidenced by Wernli, et al., U.S. Pat. No. 1,521,740, Bertram, U.S. Pat. No. 3,063,061, Starkweather, U.S. Pat. No. 3,105,665, Mintz, U.S. Pat. No. 3,122,397, and Dalton, U.S. Pat. No. 3,950,794. All of these designs have legs hinged at about their midpoints and fold to be relatively flat when stored.

Nevertheless, a need exists to improve over these designs. Bellamy, U.S. Pat. No. 6,081,942 is another portable toilet, but requires a tree to connect the relatively bulky apparatus. Improvements may be made over this design as well.

SUMMARY OF THE INVENTION

Consequently, it is a primary object of the present invention to provide an improved portable toilet.

It is a further object of the present invention to provide a camp toilet which is easily carried from location to location for use in the outdoors.

Accordingly, the present invention provides a portable toilet having two sets of two legs. The two legs are connected at one end, preferably at a pivot at the top end, while the bottom of the legs may be utilized as supports on the ground. Intermediate the supports on the ground and the pivot are two horizontal members which extend substantially parallel to one another and are connected to each of the legs. The horizontal members form the seat for the user. The legs have a stop which limits the outward spread of the supports from one another to a predetermined maximum distance. Additionally, the legs may be collapsed for portage and the horizontal seat members may be removed in some embodiments.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1:
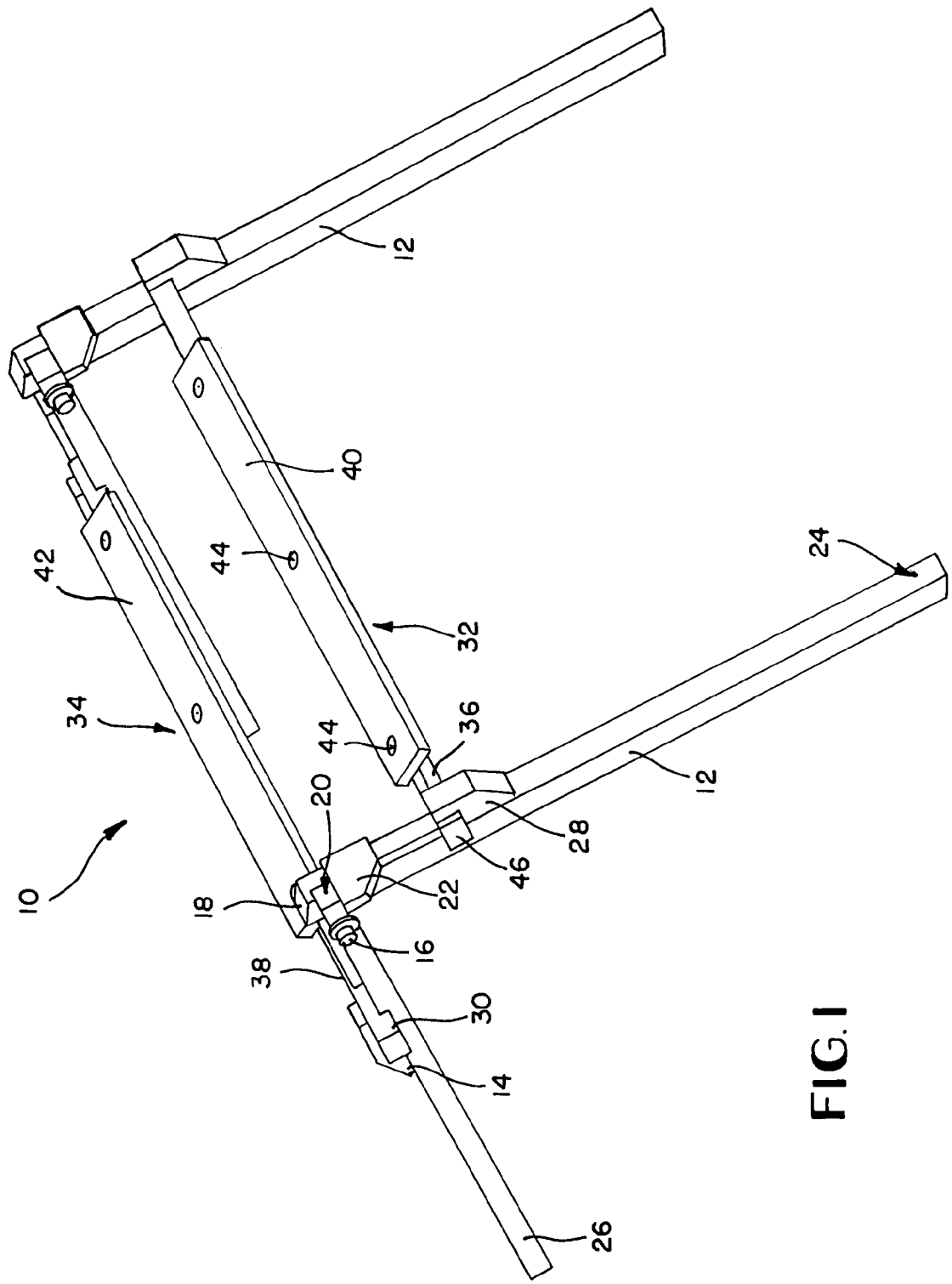
FIG. 1 is a top perspective view of the a first preferred portable toilet.
Figure 2:
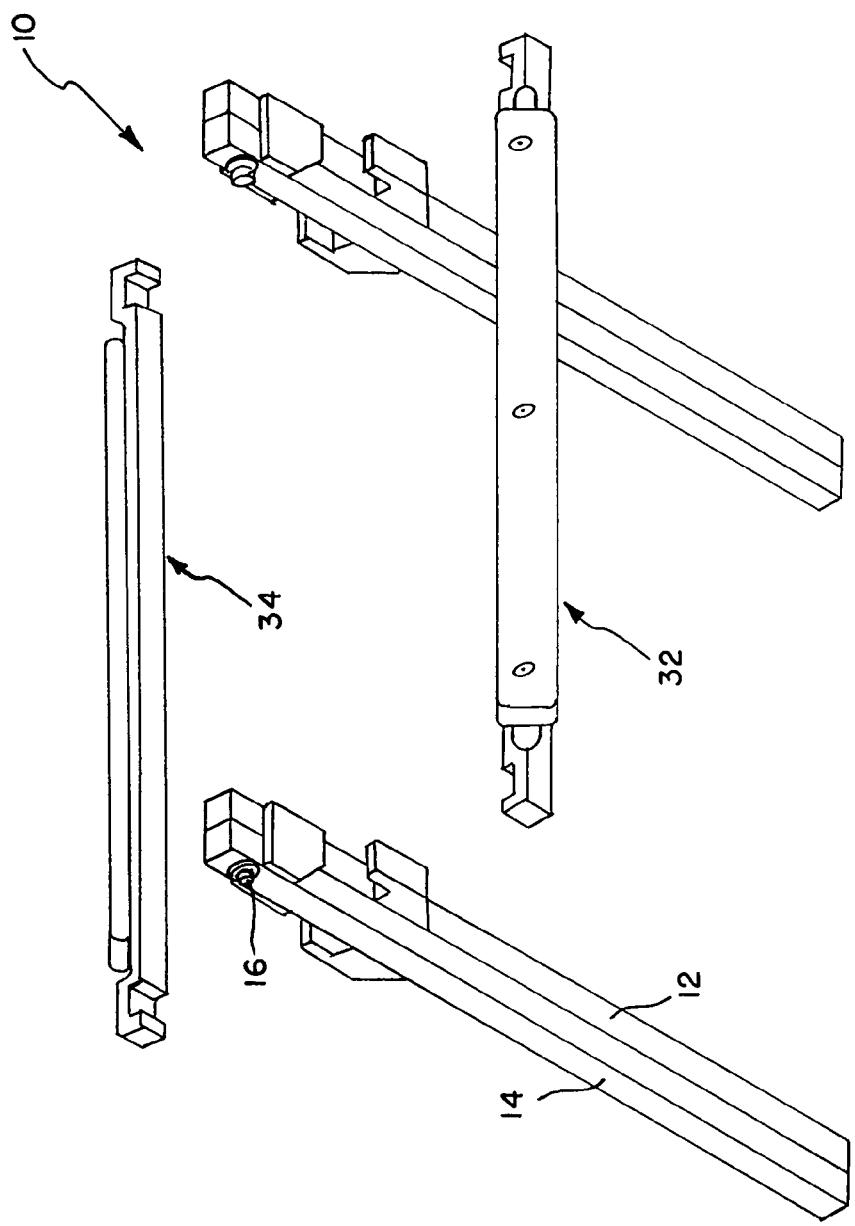
FIG. 2 is a top perspective view of the toilet of FIG. 1, partially disassembled.
Figure 3:
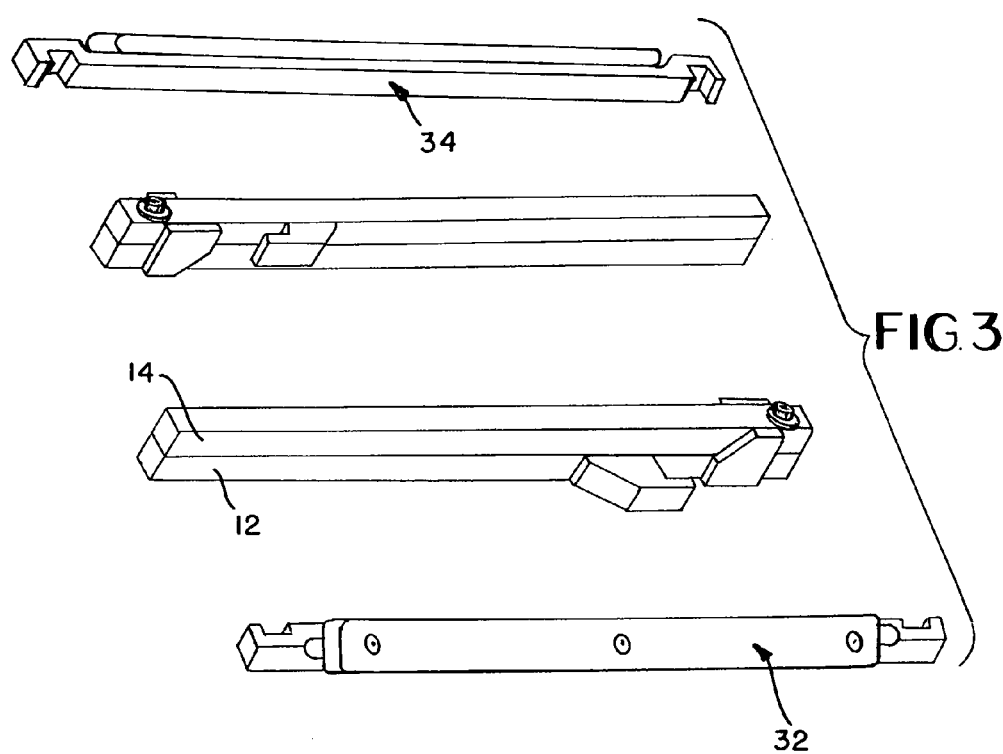
FIG. 3 is a top perspective view of the toilets of FIGS. 1 and 2 with parts aligned for storage.

Referring to FIGS. 1–3, a first preferred embodiment of the portable toilet 10 is illustrated. The toilet 10 is comprised of two sets of legs 12, 14. The legs 12,14 are connected at a joint illustrated as pivot 16 which is located at, or at least proximate to, the upper end 18 of the first leg 12. The pivot 16 may also be at, or at least proximate to, the upper end 20 of the second leg 14.

The pivot 16 allows the legs 12,14 to rotate between a folded, or closed position, illustrated in FIGS. 2 and 3, and the open position illustrated in FIG. 1. When in the fully open position illustrated in FIG. 1, the second leg contacts a stop member 22 connected to the upper end 18 of the first leg 12 to prevent further outward movement of the legs 12,14 from one another. Accordingly, the lower ends 24,26 of the legs 12,14 may only move a predetermined distance away from one another since the stop 22 prevents further rotation.

Of course, other joints may be utilized other than pivots 16, such as a fixed or removable elbow, a linkage, a connection, or other appropriate joint. It is preferred that the joint be displaceable, or capable of relatively easy disassembly to assist in providing a toilet 10 that is easy to transport.

Arms 28,30 are connected to the first and second legs 12,14. The arms 28,30 connect the seat members 32,34 to the legs 12,14. The seat members 32,34 are comprised of seat supports 36,38 and seat surfaces 40,42. The seat surfaces 40,42 may be integral portions of the seat supports 36,38 or connected by connectors 44 as illustrated. The seat surfaces 40, 42 receive the seat, or buttocks, of a user. The seat supports 36,38 have extensions 46,48 which cooperate with arms 28,30 to retain the seat members 32,34 in a substantially parallel and horizontal relationship relative to one another. The seat supports 36,38 may be easily removed from the legs 12,14 as illustrated in FIGS. 1–3, or may be more fixedly connected as illustrated in the alternatively preferred embodiment of FIGS. 4–5.

The preferred toilet 10 has two sets of legs 12,14 which may be constructed from metal tube stock having a cross section ¾ inch×¾ inch which is ⅛ inch thick. The seat supports 36,38 may be constructed of a similar tube stock which may be machined in an appropriate manner. The seat surfaces 40,42 may be wood strips ½×1½ inches or other appropriate material and/or size. The arms 28,30 may be metal or other appropriate material. The stops 22 may be a metal plate or other appropriate device and/or material.

FIG. 2 shows a partially disassembled toilet 10. The pairs of legs 12, 14 have been rotated about pivot 16 to a closed configuration. The seat members 32,34 have been removed from the arms 28,30.

FIG. 3 shows the two pairs of legs 12,14 and the seat members 32,34 arranged in a substantially parallel relationship. This arrangement provides a neat bundle of parts which may be placed in a bag, connected together such as with a strap, or otherwise grouped for carrying.

Figure 4:
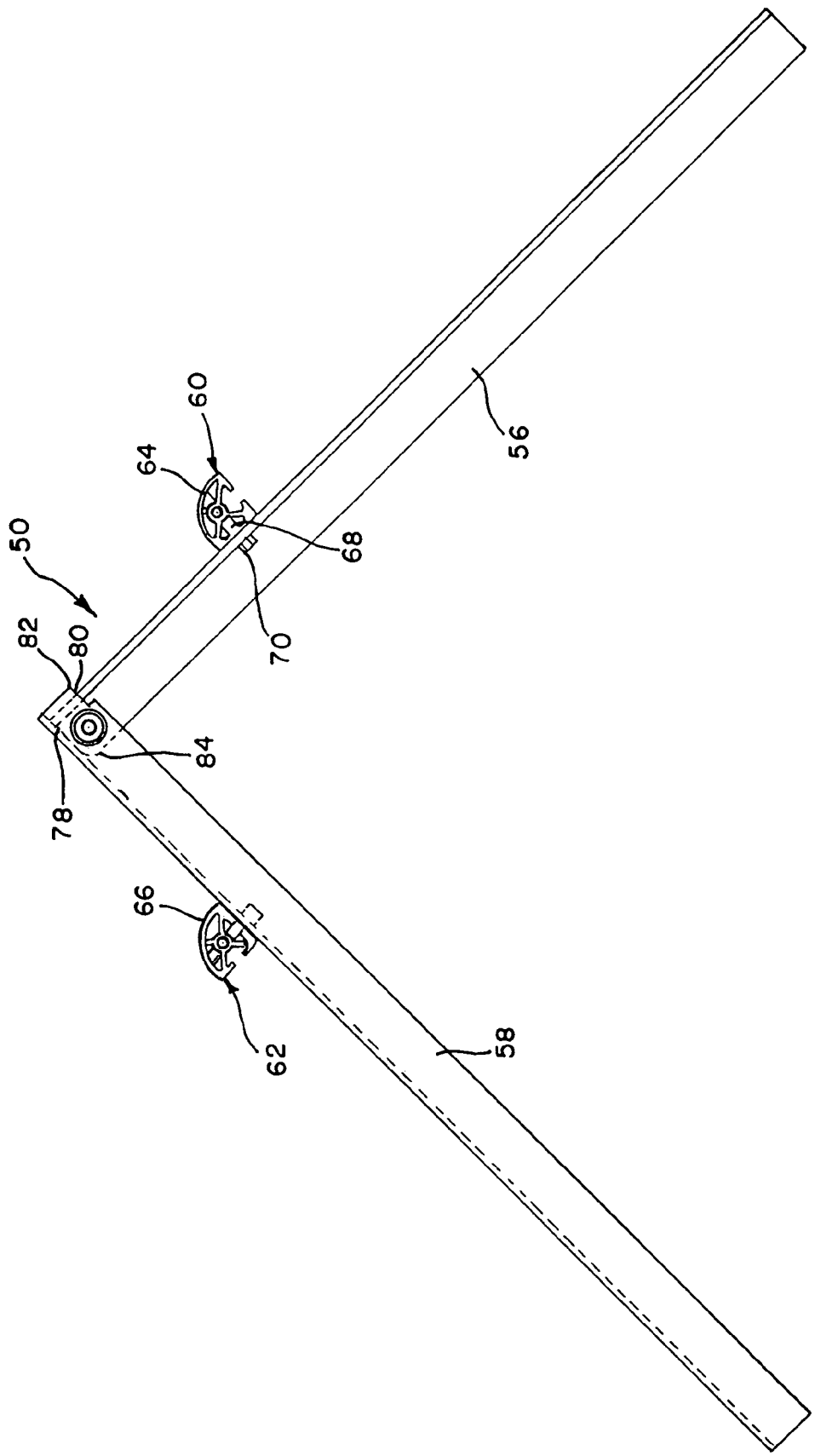
FIG. 4 is a side plan view of an alternatively preferred embodiment of the portable toilet.
Figure 5:
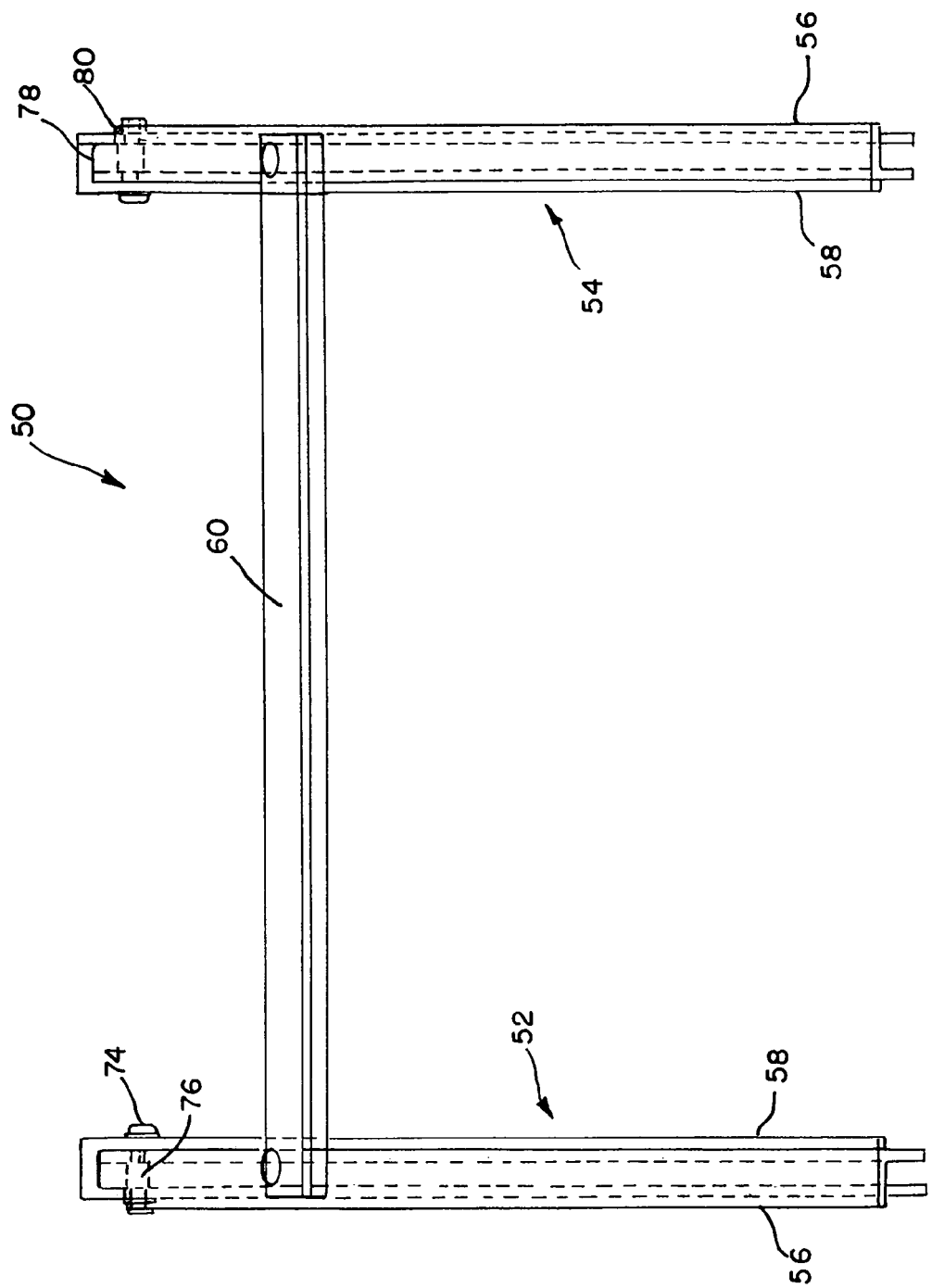
FIG. 5 is a front plan view of an alternatively preferred embodiment of the portable toilet.

The alternatively preferred toilet 50 of FIGS. 4 and 5 is very similar to the toilet of FIGS. 1–3. Two pairs 52,54 of legs 56,58 support seat members 60,62 as illustrated. The seat members 60,62 have seat surfaces 64,66 which are curved, such as over a ninety degree arc, i.e., a quarter round. The seat supports are connected by bolts 68 and locknuts 70 to the legs 56,58 instead of being supported by arms connected to the legs as is done in the embodiment illustrated in FIGS. 1–3.

Instead of utilizing tubular members for legs, the legs 56,58 of the embodiment illustrated in FIGS. 4 and 5 are comprised of angle members. The angle members are spaced apart by a low friction spacer 76 at the pivots 74 which are bolts retained by a locknut.

The stop mechanism of this embodiment is also slightly different. The first leg 56 has a first end 78 which contacts an upper portion 80 of the second leg at a predetermined amount of rotation about the pivot 74. The first end 78 of the first leg 56 may also be machined with a shoulder 80 which contacts a catch 82 on the second leg 58 at the predetermined amount of rotation to stop further rotation of the legs 56,58 relative to one another such as about ninety degrees, less than, or equal to, about ninety degrees, between about twenty and ninety degrees, and/or between about forty-five and ninety degrees. Rounded edge 84 may assist the first leg 56 in rotating from a closed configuration (similar to the configuration illustrated in FIGS. 2 and 3) to the open position illustrated in FIG. 4.

The machining of the shoulder 80 and catch 82 on the legs 56,58 along with the rounded edge 84 allows for the use of less material, and a smaller cross section than the use of tubular members for legs as is done in the embodiment of FIGS. 1–3. A smaller cross section is believed to equate to a lighter weight, a more compact closed position, and a cheaper production cost.

In both embodiments illustrated, the pivots 16,74 at the top of legs 12,14,56,58 has been found helpful in providing additional strength which is not believed would be available if the pivot 16 were positioned below the seat members 32,34,60,62 as is traditionally done in the prior art. With the pivots 16,74 located above the seat members 32,34,60,62, the distance between the legs 12,14,56,58 at the ground may be greater and/or offer more stability than for the traditional configuration where the seat members are located above the pivot points of where the legs connect to one another. This is believed to be confirmed as by the strength of suspension bridges where the "pivot" is at the top of the structure while the road ("seat numbers") is between the "pivot" and the base of the support piers.

In the open position it is desirable for the seat members to be located at about at least the top two thirds of the vertical distance from the pivot to the lower ends of the legs, more preferably to be at about the top half, still more preferable to be at about the top third, and finally most preferable to be at about the top quarter of the vertical distance of the pivot to the lower ends of the legs, as illustrated.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A portable toilet for a user compromising:

two pairs of first and second legs compromised of angular members having top portions and lower ends, said first and second legs connected at top portions of first and second legs at joints, wherein the joints further comprise pivots, and further comprising spacers located at the pivots, said spacers spacing the first and second legs a predetermined distance apart from one another;

first and second seat members disposed in substantially parallel alignment relative to one another, said first seat member supported by the first legs of the two pairs of legs and having a first seat surface connected thereto, said second member supported by the second legs of the two pairs of legs and having a second seat surface connected thereto; and wherein the seat members are located between the joints and the lower ends of the first and second legs, and the first and second seat members receive a seat of the user.

2. The portable toilet of claim 1 wherein the joints further comprise pivots and the first leg further comprises a shoulder located at a top end, and said second leg further comprises a catch located at a top end, said shoulder and said catch cooperating to prevent rotation of the first and second legs beyond a predetermined amount.

3. The portable toilet of claim 1 wherein the first leg further comprises a curved exterior surface at the top end of the leg to allow rotation of the first and second legs relative to one another.

4. A portable toilet for accommodating buttocks of a user compromising:

two sets of first and second legs connected at top portions of the first and second legs at pivots;

stop members limiting the outward rotation of ends of the first and second legs from one another from a closed position to a maximum open position, the first and second legs forming an angle of less than about ninety degrees in the maximum open position, and the stop members are portions of at least one of the first and second legs;

first and second seat members supported in substantially parallel alignment relative to one another, said first seat member supported by the first legs of the two sets of legs, said second member supported by the second legs of the two sets of legs;

wherein the toilet has an open and a closed configuration wherein when in the closed configuration, the first and second legs are substantially parallel to one another, and when in the open configuration, the first and second legs are pivoted from the closed configuration about the pivots to space the lower leg ends of the first and second legs a distance from one another; and wherein the seat members are spaced a predetermined distance from the pivots, and when in the open position are located a distance below the pivots providing support surfaces for the buttocks of the user.

* * * * *